United States Patent [19]

Ryham

[11] Patent Number: 4,878,441
[45] Date of Patent: Nov. 7, 1989

[54] APPARATUS AND PROCESS FOR GENERATING STEAM FROM WET FUEL

[75] Inventor: Rolf Ryham, Princeton, N.J.

[73] Assignee: Ahlströmforetagen Svenska AB, Norrkoping, Sweden

[21] Appl. No.: 231,085

[22] Filed: Aug. 11, 1988

[51] Int. Cl.[4] .............................................. F23G 7/04
[52] U.S. Cl. .................................. 110/238; 110/224; 110/234; 110/341; 122/367 PF
[58] Field of Search ............... 110/224, 221, 234, 341, 110/238; 122/5.5 A, 367 PF, 479 A, 28

[56] References Cited

U.S. PATENT DOCUMENTS

| 4,311,103 | 1/1982 | Hirose | 110/238 |
| 4,388,875 | 6/1983 | Hirose | 110/22 Y |
| 4,429,643 | 2/1984 | Mulholland | 110/221 X R |

Primary Examiner—Edward G. Favors
Attorney, Agent, or Firm—Cohen, Pontani & Lieberman

[57] ABSTRACT

A process and apparatus for generating steam from wet fuel, wherein water is evaporated from the wet fuel by bringing the fuel into direct contact with superheated steam. The steam is superheated by bringing it into contact with a hot heat carrier. The heat carrier is heated by bringing it into direct contact with flue gas produced by burning the dried fuel and the heat carrier is used to superheat the steam.

19 Claims, 2 Drawing Sheets

APPARATUS AND PROCESS FOR GENERATING STEAM FROM WET FUEL

TECHNICAL FIELD

The present invention relates generally to the generation of steam from wet fuel and more particularly to a process in which the fuel is dried by using the heat energy of flue gas generated by combusting the dried fuel in a furnace. The energy of the process is available in form of steam. The process can be applied, e.g. to any solid organic combustible material having a high water content such as bark and peat or to sludges such as spent pulping liquors and the like.

BACKGROUND OF THE INVENTION

To recover chemicals and generate steam, spent pulping liquor known as black liquor is usually burned in a recovery boiler. The organic compounds of the black liquor are recovered in the form of a smelt which can be regenerated to provide pulping liquor. Heat is thereby removed from the flue gas by heat transfer elements such as water filled tubes in which the water is converted into steam by indirect heat exchange. The heat content of the flue gas discharged from the furnace can be used to concentrate black liquor by evaporation by direct heat exchange wherein a product having a dry solids content of about 55% is coinverted into a product having a dry solids content of 65-70%. This method involves, however, disadvantages regarding the heat economy as well as environmental problems.

To avoid the drawbacks caused by the direct contact between the flue gas and the black liquor it has been suggested, as is described in the Canadian Pat. No. 917858, to concentrate black liquor to a dry solids content of 65-70% in a cascade evaporator by direct contact with a circulating steam flow, which is superheated by indirect contact with the flue gas from the recovery furnace. The recovery furnace is of conventional design and is provided with water filled tubes. The black liquor supplied to the cascade evaporator has been concentrated to a fairly high dry solids content in a conventional system.

DISCLOSURE OF THE INVENTION

It is an object of the present invention to eliminate all liquid cooled stationary heat transfer surfaces in the process and apparatus of this invention.

It is an other object of the present invention to enable the removal of water from wet fuel without directly contacting the wet fuel with a heat transfer surface.

It is a further object of the present invention to essentially eliminate the feed water system of the furnace by generating steam from the water content of the fuel.

According to the method and apparatus of the present invention, (a) water is evaporated from wet fuel by directly contacting the wet fuel with super heated steam thereby producing dried fuel and saturated steam; (b) at least a portion of the saturated stream is superheated by directly contacting the steam with a hot heat carrier thereby producing a cooled heat carrier; (c) the cooled heat carrier is heated by directly contacting the carrier with flue gases produced by burning the dried fuel from step (a) and (d) the heated heat carrier is used as the heating medium in step (b).

It is an advantage of the present invention that the steam which is produced during the process is derived from the wet fuel. As fuel in the method and apparatus of the present invention any combustible material may be utilized. Thus, the fuel may be any combustible material such as wood residue and bark, sewage sludge, oil refinery wastes, sludge from paper and pulp processes, sludges from the pharmaceutical industry and, of course, carbonaceous materials such as coal. The dry solids content of the wet fuel is not important as long as the heat content of the dried fuel is sufficient to drive off the water from the fuel and the fuel will burn without auxiliary combustible material. Is the heat content of the fuel insufficient to evaporate the water from the fuel prior to the combustion thereof, the heat content of the fuel may, however, be supplemented by the addition of other combustible material in the furnace or by using multiple evaporation technique for part of the water removal or a combination of both. Such modification is understood to be a part of the present invention.

The method and apparatus of the present invention may also be used advantageously as a mobile operation which can be moved to and operated at any particular location as needed. Thus, peat having a dry solids content of about 15% could be harvested at location and burned in the apparatus and according to the method of the present invention at the harvest site. The water is evaporated from the wet peat by bringing it into direct contact with superheated steam in an evaporator or boiler thereby producing dried peat moss and saturated steam which may be utilized to drive a turbine for the generation of electricity. A portion of the saturated steam is superheated by direct contact with a hot heat carrier resulting in superheated steam and a correspondingly cooled heat carrier. The cooled heat carrier is thereafter contacted with flue gases produced by burning the dried peat from the evaporation stage. The hot heat carrier is utilized for producing the superheated steam from the saturated steam as mentioned above.

Accordingly, when the method is applied to peat, it is possible to use pressed peat having a dry solids content of 12-15% without predrying it. The heat content of dry peat is 3500-4000 Kcal/kg, which means that about 6-7 kg normal steam/kg dry fuel can be produced. It is thus possible to generate about 6-7 kg steam from about 7-8 kg wet fuel. About the same result is achieved by processing spent pulping liquor.

The invention will be described in more detail in the following with reference to the accompanying drawings, which illustrate preferred embodiments of the invention.

DESCRIPTION OF THE PRESENT PREFERRED EMBODIMENT

Figure 1:
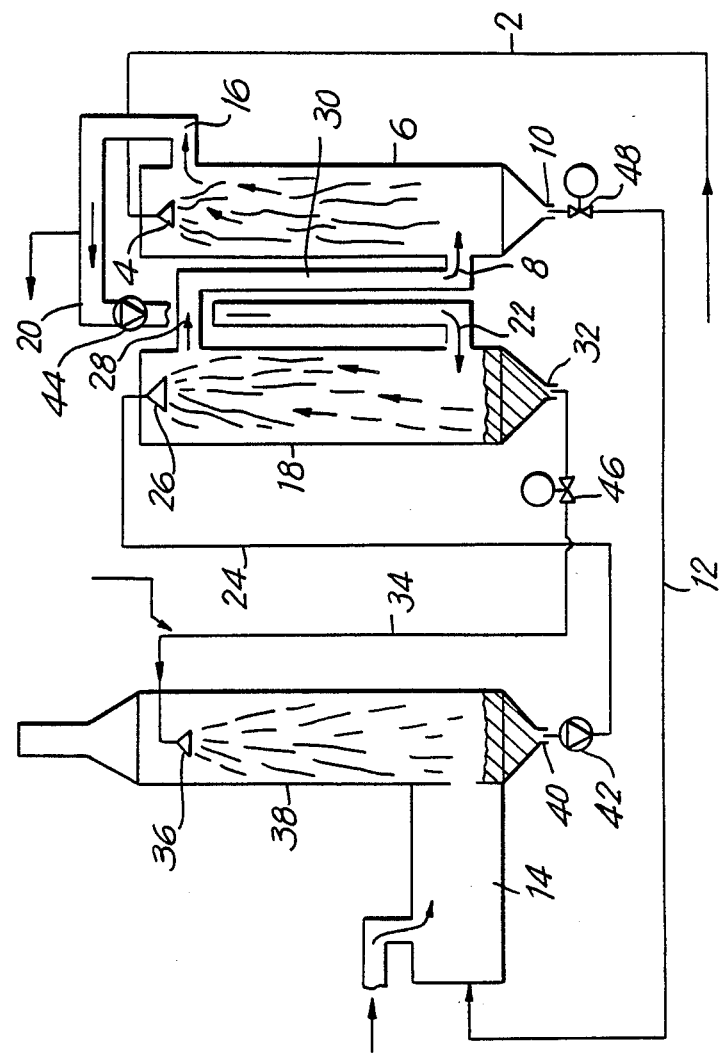
FIG. 1 is a schematic view of a system for carrying out the process according to the invention.

As shown in FIG. 1, wet fuel such as, for example, black liquor is introduced through line 2 preferably into the upper part of an upright evaporator or boiler 6. The fuel is distributed in finely divided form preferably evenly, by any suitable means such as distributor 4. Superheated steam having a temperature of about 400° C. is then introduced through inlet 8 preferably located in the lower part of the evaporator which may be pressurized. At least a portion of the superheated steam may be removed for external use such as, for example, for driving a turbine. The steam flows through the evaporator preferably in counter-flow to and in direct contact with the wet fuel flowing down from the distributor means. Due to the superheated steam directly contacting the wet fuel, water is removed from the black liquor by evaporation coinverting the superheated steam into saturated steam having a temperature of about 250° C. and a pressure of about 40 bar. The steam contains the water evaporated from the black liquor. The black liquor with the water removed therefrom, is discharged through outlet 10, preferably located at the bottom of the evaporator, and passed through line 12 to furnace 14. The steam exiting evaporator 6 is supplied to a preferably pressurized scrubber 18 through line 20. The saturated steam is introduced into scrubber 18 through inlet 22 which is preferably located in the lower part of the scrubber. In scrubber 18 the saturated steam is superheated to a temperature of about 400° C. by direct contact with an inert hot heat carrier having a temperature of about 500° C. The heat carrier may be any material which absorbs heat and which is inert, i.e. will not react with other process reactants or components or be altered thereby or vice vera. Examples of suitable inert heat carriers are thermal stable oils, liquid metals, solid metals, sand and ceramic materials such as refractory particulate material which can be heated without decomposition or substantial structural change to at least about 450° to about 500° C.

The hot heat carrier is supplied to scrubber 18 through a line 24 via a distributor means 26 preferably disposed in the upper part of the scrubber. Scrubber 18, as evaporator 6, is preferably pressurized. Saturated steam is flowing through scrubber 18 in counter-flow and in direct contact with the hot heat carrier flowing down from distributor means 26 being preferably evenly distributed thereby. The superheated steam is discharged from scrubber 18 through outlet 28, preferably located in the upper part of the scrubber, and is past to evaporator 6 through line 30 connecting scrubber outlet 28 to evaporator inlet 8. The heat carrier which has cooled down to about 300° C. by transfer of heat to the saturated steam is collected at the bottom of scrubber 18 and discharged through outlet 32 in the bottom thereof and passed through line 34 to distributor means 36 preferably disposed in the upper part of a stack scrubber 38. As will be recognized the structure of distributor means 4, 26 and 36 such as, for example, nozzles or rotating disks will depend on the respective fuel and heat carrier utilized in the process of the present invention. To increase the respective surface of the fuel and the heat carrier, both materials are preferably evenly distributed and in finely divided form throughout the respective reaction vessel such as evaporator 6, scrubber 18 and stack scrubber 38.

Flue gas from furnace 14 introduced into stack scrubber 38 preferably at the bottom thereof flows in counter-flow and in direct contact with the heat carrier flowing down from distributor 36 thereby heating the heat carrier to a temperature of about 500° C. The hot heat carrier is then discharged from the stack scrubber through outlet 40 located preferably in the bottom thereof and passed through line 24 to scrubber 18.

As mentioned above, scrubber 18 and evaporator 6 are preferably pressurized whereas furnace 14 and stack scrubber 38 are at approximately atmospheric pressure. It will be understood that stack scrubber 38 may be a fluid bed installation, preferably a circulating fluidized bed wherein the heat content of the flue gas is transferred to the inert heat carrier in direct contact therewith and wherein the hot heat carrier may be discharged from and the cool heat carrier returned to the fluidized bed as required.

Figure 2:
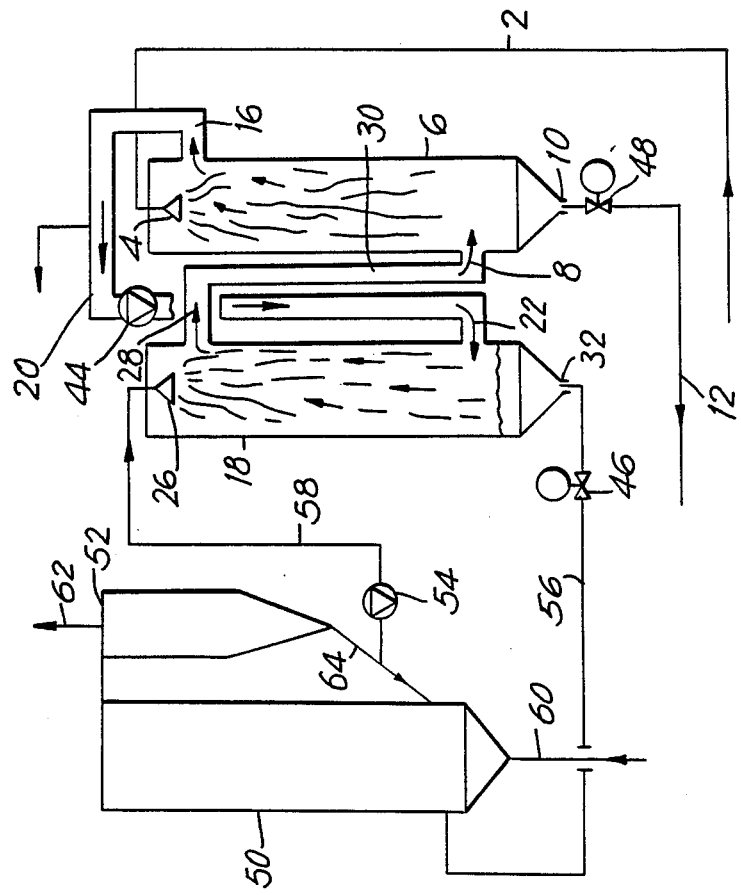
FIG. 2 is a schematic view of another embodiment of the apparatus and the process of the present invention.

As shown in FIG. 2 the cooled heat carrier having a temperature of about 300° C. is removed from scrubber 18 through outlet 32 in the bottom thereof and introduced via valve 46 and line 56 into circulating fluidized bed chamber 50. As fluidizing gas for the heat carrier is preferably used the flue gas from a furnace (not shown) which is introduced into the bottom of fluidizing chamber 50 through line 60. As described in connection with FIG. 1, the fuel dried in evaporator 6 is removed therefrom through outlet 10 and transferred via valve 48 through line 12 to a furnace (not shown). The flue gas from the furnace is preferably used as the fluidizing gas in the circulating fluidized bed as described. In the fluidized bed chamber 50, the heat carrier will remove heat from the flue gas. The heated heat carrier entrained in the flue gas leaves chamber 50 and is separated in separator 52 in known manner, whereby the fluidizing gas is removed through outlet 62 and the heat carrier is recycled through line 64 to the bottom of chamber 50. Heated heat carrier may be withdrawn from the circulating fluidized bed and introduced into scrubber 18 through line 58. In case scrubber 18 and evaporator 6 are pressurized the heat carrier is introduced into scrubber 18 via pump 54 which may, for example, be a rotary screw pump. The heat carrier, such as sand, may also be fluidized in a thermally stable liquid as a carrier so that the sand can be pumped with centrifugal force. After the desired pressure has been achieved, the fluidizing liquid may be removed prior to the heat carrier reaching distributor 26. The removed fluidizing liquid is thereafter returned to the suction side of pump 54.

Structural elements of the evaporator, scrubber, stack scrubber and fluidized bed are standard technology and need not be discussed further.

Pumps 42 and 54 for conveying the hot heat carrier from stack scrubber 38 (circulating fluidized bed 50, 51) to scrubber 18 and fan 44 for circulating the steam are also of conventional design and need not be further described.

Of course, any other suitable means for transporting the heat carrier and the fuel such as screw feeders may be used. It is also understood that the process may be performed at atmospheric pressure if only water is intended to be produced. If the process is performed at atmospheric pressure additional conveying means are needed, for example, pumps in line 12 to convey the dried fuel to the furnace 14 and in line 34 to convey the heat carrier to stack scrubber 38.

The advantages of the described system for generation of steam and recovery of chemicals from black liquor compared with a conventional recovery boiler and evaporator system are that (a) the black liquor can be concentrated to a dry solids content of up to 100%; (b) no heat transfer surfaces in contact with the black liquor are required in the evaporator; (c) there are no water cooled surfaces in the recovery furnace; and (d) no feed water system is required.

The most serious drawback of a water-cooled recovery boiler is that there is always the risk of water leakage. A leakage of water into the smelt results usually in a violent explosion causing damage to the apparatus as well as injury to the operating personnel. As there are no tubes in the furnace of the present invention, there are present less restrictions regarding the structural design of the furnace. The furnace may be constructed irrespective of the demands a circulating water/steam heat exchange medium may set regarding the design parameters thereof.

The above-mentioned advantages of the apparatus and method of the present invention not only apply to the processing of black liquor but also to other suitable fuels such as peat, industrial waste materials and sludges.

While a specific embodiment of the invention has been shown and described to illustrate the principals of the invention, it will be understood that the invention may be embodied otherwise without imparting from such principals. Thus, the present invention may be utilized in connection with pressurized combined cycles without using any water filled heat transfer surfaces. In certain cases, for instance, if the heat carrier is easily entrained by a gas flow in the stack scrubber, it may be preferred to cause the heat carrier to flow in the same direction as the flue gas. The heat carrier will then be introduced at the lower end of the stack scrubber and be separated from the gas in a cyclone separator connected to the upper end of the stack scrubber. If desired, a portion of the heat carrier can also be recycled to the stack scrubber.

To overcome the pressure within pressurized scrubber 18 the heat carrier may be fed from stack scrubber 38 through line 24 by any suitable conveying means such as a screw feeder. Also, if a smelt is used as heat carrier a ceramic pump may be used for conveying the hot smelt, for example, from a recovery boiler.

It should be understood that the preferred embodiments and examples described above are for illustrative purposes only and are not to be construed as limiting the scope of the invention which is properly delineated only in the appended claims.

What is claimed is:

1. A process for generating steam from wet fuel comprising the steps of:
    (a) evaporating water from said wet fuel by bringing said fuel into direct contact with superheated steam, whereby dried fuel and saturated steam are produced;
    (b) superheating at least a portion of said saturated steam by bringing said steam into direct contact with a hot heat carrier, whereby a cooled heat carrier is produced;
    (c) heating said cooled heat carrier by bringing said heat carrier into contact with flue gases produced by burning said dried fuel from step (a); and
    (d) using said heated heat carrier as the heating medium for said steam in step (b).

2. The process of claim 1, wherein said wet fuel is spent pumping liquor.

3. The process of claim 1, wherein said wet fuel is a solid fuel.

4. The process of claim 1, wherein said heat carrier is a ceramic material.

5. The process of claim 1, wherein said heat carrier is sand.

6. The process of claim 1, wherein said fuel flows in counterflow to the steam in step (a).

7. The process of claim 1, wherein said heat carrier flows in counterflow to the steam in step (b).

8. The process of claim 1, wherein said heat carrier flows in counterflow to said flue gas in step (c).

9. The process of claim 1, wherein said wet fuel is dried to a dry solids content of about 100%.

10. The process of claim 3, wherein said solid fuel is peat.

11. An apparatus for the generation of steam from wet fuel comprising:
    (a) means for evaporating water from wet fuel comprising a first chamber, means for introducing wet fuel into said first chamber, means for discharging steam from said first chamber, means for discharging dried fuel from said first chamber, and means for introducing superheated steam into said first chamber for direct contact with the wet fuel for causing the evaporation of water from the fuel.
    (b) means for generating superheated steam comprising a second chamber, means for introducing a heated heat carrier into said chamber, means for feeding the steam discharged from said first chamber into said second chamber, means for discharging superheated steam from said second chamber; means for feeding the discharged superheated steam to said first chamber; and means for discharging cooled heat carrier from said second chamber;
    (c) means for combusting the dried fuel whereby flue gas is generated;
    (d) means for generating a heated heat carrier for introduction to said second chamber comprising a third chamber, means for introducing the flue gas from said combusting means into said third chamber, means for introducing into said third chamber the cooled heat carrier discharged from said second chamber for heating of the heat carrier by the flue gas in said third chamber, means for discharging the heated heat carrier from said third chamber and means for feeding the heated heat carrier from said discharge means to said second chamber; and
    (e) means for feeding the dried fuel from said first chamber to said combusting means.

12. The apparatus of claim 11, wherein said wet fuel is spent pulping liquor.

13. The apparatus of claim 11, wherein said wet fuel is a solid fuel.

14. The apparatus of claim 11, wherein said heat carrier is a ceramic material.

15. The apparatus of claim 11, wherein said heat carrier is sand.

16. The apparatus of claim 11, wherein said means for introducing said wet fuel into the first chamber and said means for introducing said superheated steam into said first chamber are located so that said fuel flows in counter-flow to said steam in said first chamber.

17. The apparatus of claim 11, wherein said means for introducing said heat carrier into said second chamber and said means for feeding the steam discharged from said first chamber into said second chamber are located so that said heat carrier flows in counter-flow to said steam in said second chamber.

18. The apparatus of claim 11, wherein said means for introducing the flue gas from said combusting means into said third chamber and said means for introducing said cooled heat carrier into said third chamber are located so that said heat carrier flows in counter-flow to said flue gas in said third chamber.

19. The apparatus of claim 11, wherein said means for generating said heat carrier is a fluidized bed chamber, said means for introducing the flue gas and the cooled heat carrier being located at the bottom of said chamber, said means for discharging the heat carrier entrained in said flue gas being located at the top of said chamber; and further comprising a separator connected to said means for discharging the heat carrier for separating said flue gas from said heat carrier and means for recycling at least a part of said discharged heat carrier back to said fluidized bed chamber at a location above said flue gas introducing means; said separator being located between said means for discharging said heat carrier and said means for feeding the heated heat carrier to said second chamber.

* * * * *